A. S. SPIEGEL.
APPARATUS FOR FORMING ROOFING SHINGLES.
APPLICATION FILED FEB. 3, 1914.
1,116,149.
Patented Nov. 3, 1914.
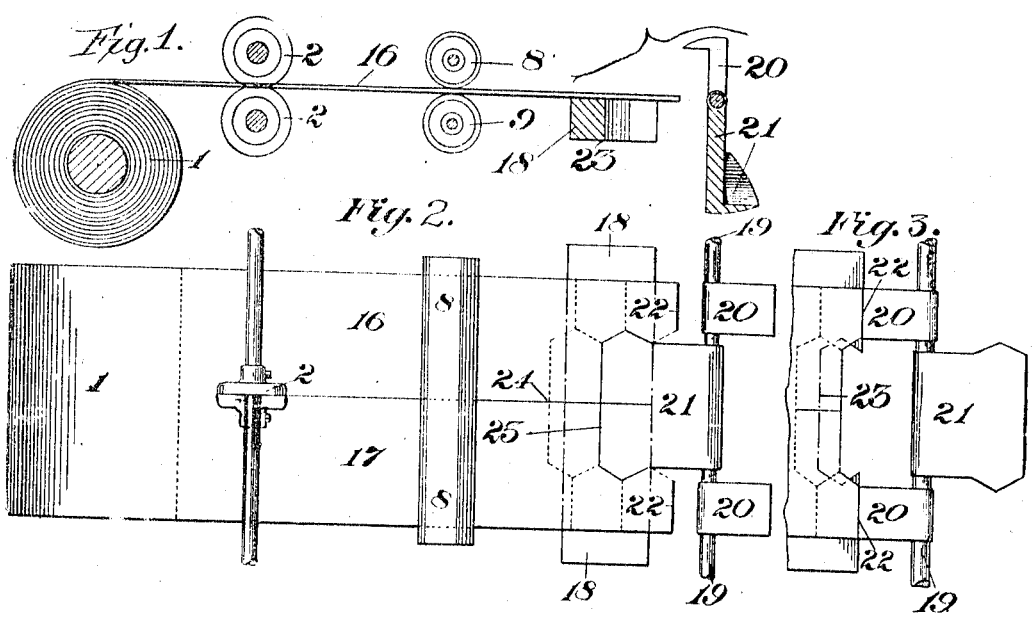
Attest:
J. M. Hamilton
Arthur Middleton
Inventor:
A. S. Spiegel.
by Shear Middleton Donaldson Shear
Attys.

UNITED STATES PATENT OFFICE.

ALEXANDER S. SPIEGEL, OF CHICAGO, ILLINOIS.

APPARATUS FOR FORMING ROOFING-SHINGLES.

1,116,149.  Specification of Letters Patent.  Patented Nov. 3, 1914.

Application filed February 3, 1914. Serial No. 816,309.

*To all whom it may concern:*

Be it known that I, ALEXANDER S. SPIEGEL, citizen of the United States, residing at Chicago, Illinois, have invented certain new and useful Improvements in Apparatus for Forming Roofing-Shingles, of which the following is a specification.

This invention relates to machines for cutting shingles from prepared roofing and consists essentially in the knife for performing the cutting operation.

With these and other objects in view, the invention includes the novel features of construction and arrangement of parts hereinafter described and more particularly pointed out in the claims, it being understood that I do not intend to limit myself to the details of the different parts of my invention.

I have illustrated my invention in the accompanying drawings, in which—

Figure 1 is a side elevation of my invention. Fig. 2 is a top plan view of my improved device. Fig. 3 is a partial view showing the narrow knives in operation.

In the drawings, 1 indicates the roofing material, 2 cutters for cutting a straight slit forming two strips 16 and 17, 8 and 9 feed rollers, of any ordinary or improved construction. The roofing is fed to a block 18 of particular construction to form an edge, which, while supporting the roofing material, conforms to the shape of the cutters so as to enable a shear cut to be made.
The shingles are made by rotary cutters which, as shown in Fig. 2, cut out two central shingles from the center of the strip, when the strip is of double width and following cutters sever marginal shingles, the cutters having such relation to each other as to cut the shingles from the strips in staggered relation. The cutters are three in number, mounted upon a rotary shaft 19 suitably driven, the center cutter, indicated at 21, having the configuration shown where it cuts into a double strip so as to cut out from the strip two complete shingles, the line of severance between having been made by cutters 2. Side cutters 20 make the line of severance for the marginal shingles 22.

Fig. 3 shows the knives 20 performing a cut 22 on the outer portions of the strips 16 and 17. Fig. 1 shows the knife 21 in cutting position over the block 18, wherein is an opening 23 to correspond to the shape of the knife 21 which operates therewith to allow a shingle portion, the shape of the knife 21, to be cut out and to fall through the opening. The knife 21 in its rotation passes through this opening. The dotted lines are to show where the successive cuts of the respective knives will be made. The feed of roofing material to the block 18 is so timed in relation to the rotary shaft 19 that one shingle width will be fed to every revolution of the shaft. When it is remembered that the roofing is severed at 24 before it reaches the knife 21, it can be seen how each cut of this knife severs two shingles while the knives 20 sever one each.

The order of operation of the central cutters and the marginal cutters is immaterial, as one may begin and the others follow or vice versa without in any way affecting the efficient operation of the devices.

I do not limit myself to the forming of roofing shingles by this apparatus, as it may be adapted to the cutting of other material.

I claim as my invention:—

1. The herein described machine comprising supporting and feeding means for the material to be operated upon and means for successively cutting sections therefrom and simultaneously in the cutting action forming the complete end of one section and half of the ends of two adjacent sections, the ends of the opposing sections being cut in staggered relation, with means for severing the sections from the body material laterally, substantially as described.

2. In a machine for forming shingles from a strip or sheet of roofing material, supporting and feeding means for the material, and cutters successively cutting from said strip or sheet shingle sections first from one side and then from the other of said strip, the ends of the opposing sections being cut in staggered relation to each other to form ornamental ends, substantially as described.

3. In a machine for forming shingles, a strip or sheet of material, supporting and feeding means therefor and means for cutting out therefrom at one operation a complete shingle and forming the ornamental end of a part of two other shingles, the ends of the opposing sections being cut in staggered relation, substantially as described.

4. In a machine for forming shingles from a strip of roofing material, supporting and feeding means therefor, a cutter for cutting out the end and side of one shingle and parts of the ends of two adjacent shingle sections, and means for severing the last named sections from the strip, substantially as described.

5. In a machine for forming shingles from a strip of roofing material, supporting and feeding means therefor and a rotary cutter adapted to cut from the strip at one operation the side and ends of one shingle and parts of the ends of two adjacent shingle sections, substantially as described.

6. In a machine for forming shingles from a strip of roofing material, supporting and feeding means, a rotary cutter for severing from the strip a complete shingle and forming a part of the ends of two adjacent shingles with additional means for severing and thereby completing the said adjacent shingles following the action of the rotary cutter, substantially as described.

In testimony whereof, I affix my signature in presence of two witnesses.

ALEXANDER S. SPIEGEL.

Witnesses:
 PETER C. NIELSEN, Jr.,
 WM. THOMPSON.